United States Patent [19]

Cutler

[11] Patent Number: 5,100,325

[45] Date of Patent: Mar. 31, 1992

[54] APPARATUS AND METHOD FOR CREATING PERSPECTIVE DRAWINGS

[76] Inventor: Daniel S. Cutler, 110 Ninth St., Ann Arbor, Mich. 48013

[21] Appl. No.: 624,579

[22] Filed: Dec. 10, 1990

[51] Int. Cl.⁵ .................................. G09B 11/00
[52] U.S. Cl. ........................................ 434/91
[58] Field of Search ............... 434/85, 88, 89, 90, 434/91, 92; 128/76.5

[56] References Cited

U.S. PATENT DOCUMENTS

| | | | |
|---|---|---|---|
| 561,797 | 6/1896 | Langworthy | 434/88 |
| 599,402 | 2/1898 | Richter | 434/88 |
| 691,138 | 1/1902 | Hawley | 434/88 |
| 1,111,608 | 9/1914 | O'Brien | 434/88 |
| 1,210,608 | 1/1917 | Dannenfelser | 434/91 |
| 1,949,022 | 2/1934 | Mandaville | 128/76.5 |
| 2,079,508 | 5/1937 | Kaplowitz | 434/88 |
| 2,418,286 | 4/1947 | Austin | 434/85 |
| 2,571,613 | 10/1951 | Rissland | 434/91 |
| 3,086,296 | 4/1963 | Bergstrom | 434/90 |

FOREIGN PATENT DOCUMENTS

| | | | |
|---|---|---|---|
| 0857785 | 4/1939 | France | 434/91 |
| 0055961 | 7/1911 | Switzerland | 434/91 |

Primary Examiner—Richard J. Apley
Assistant Examiner—L. Thomas
Attorney, Agent, or Firm—Gifford, Groh, Sprinkle, Patmore and Anderson

[57] ABSTRACT

A kit for creating perspective drawings, teaching the creation of perspective drawings and method for making the same. The kit provides a pair of perpendicular supports, with the upright support having a transparent portion formed therethrough. A number of geometric objects are placed onto the flat support and are illuminated by a light source. The perspectives of the objects cast are captured by an appropriately-positioned screen. A sighting device is provided to focus the perspectives of the objects cast. A means for recording a copy of the perspective viewed onto the transparent window is further provided.

18 Claims, 1 Drawing Sheet

APPARATUS AND METHOD FOR CREATING PERSPECTIVE DRAWINGS

FIELD OF THE INVENTION

The present invention relates to an apparatus for creating and teaching the creation of perspective drawings and a method for the same.

DESCRIPTION OF THE PRIOR ART

Various types of art kits are known in the art. These kits often include pens, pencils and other writing materials. With respect to the teaching of writing styles, other kits such as painting guide kits and other teaching materials are known in the art. None of the above kits, however, disclose teaching aids for producing sketches or drawings of geometric objects. Further, not shown in the prior art, is a method for creating such perspective drawings.

SUMMARY OF THE PRESENT INVENTION

The present invention provides an apparatus and method for creating perspective drawings which overcomes the above mentioned disadvantages of the prior art devices. In brief, the apparatus for creating perspective drawings of the present invention provides a horizontal and a vertical support connected perpendicularly along a common edge. The vertical support has formed therein a transparent window permitting visual access therethrough. A number of geometric objects are placed upon the horizontal support and are illuminated either by an ambient light source or by an artificial light positioned at an angle with respect to the objects. The illuminated shape and perspective of the objects are cast upon a screen placed in the background of the objects and visible through the transparent window.

A sighting device is also provided and is mounted to the vertical support in order to optimize focusing of the object shapes and perspectives cast upon the screen, as viewed through the transparent window. The sighting device comprises first and second arms perpendicularly connected which adjustably position a sighting bore attached to the end of the second arm. In this manner, the focus of the perspectives is optimized. The shapes and perspectives of the object viewed on the screen can be recorded onto the transparent window by means of a suitable marking pen. Alternatively, a transparent plastic overlay sheet may be placed upon the transparent window for recording the visible impressions. The transparent window or plastic overlay may further have placed thereon a horizontal and vertical grid so as to increase the accuracy and precision of the written recording. The device of the present invention conveniently collapses into a portable, hand-carried case arrangement.

A method for creating perspective drawings is also disclosed. This method includes the steps of placing one or more geometric objects upon the horizontal support as indicated above, illuminating the object so as to cast its shape and perspective onto a screen, viewing the shape and perspective through the transparent window, and creating a written impression of the scene viewed.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
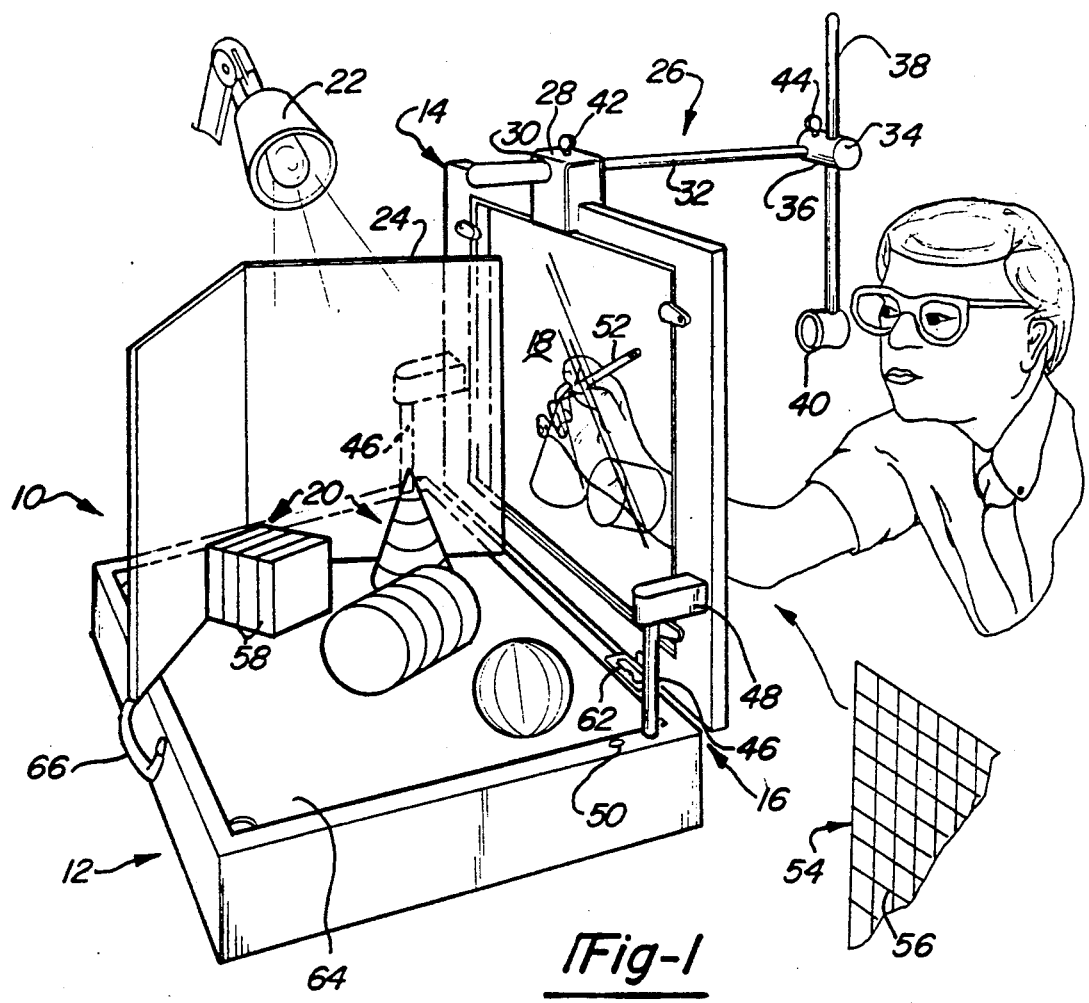
FIG. 1 is a perspective view of a preferred embodiment of the present invention.
Figure 2:
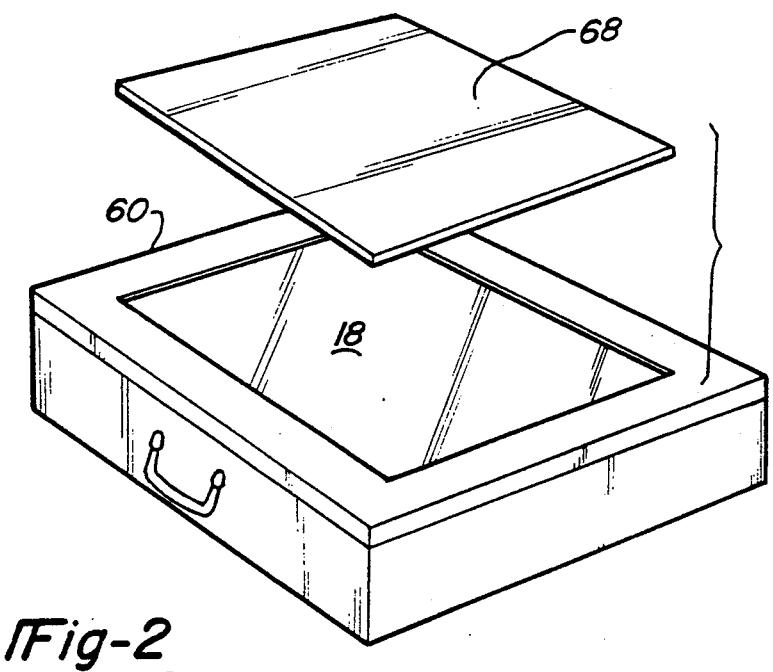
FIG. 2 is a perspective view of the portable feature of the present invention.

With reference to FIG. 1, an apparatus 10 for creating perspective drawings is thereshown and provides a horizontal support 12 and a vertical support 14. The vertical support 14 is positioned perpendicular with respect to the horizontal support 12, with both supports 12 and 14 connecting along a common edge 16. The vertical support 14 further includes a transparent window 18 formed within its interior. The window is most conveniently constructed of a transparent glass or other suitable material and is rectangular in shape in order to generally conform to the outline of the vertical support. The window 18 further is held into place within the vertical support by any coverboard retaining means. In the case of FIG. 1, turn screws 19 and lower supporting lip 21 are provided to support the window 18 in place.

Geometric objects 20 are positioned upon the horizontal support 12 and are visible through the window 18. A light source 22 is positioned at an angle with respect to the objects 20 to provide illumination. A screen 24 is positioned in the background of the objects 20 and captures the shape and perspectives of the objects 20 upon illumination by the light source 22. Under certain ambient light conditions the light source 22 may be unnecessary.

In order to optimize the focus of the shapes and perspectives viewed, a sighting device 26 is shown. The sighting device 26 includes a supporting block 28 fixably mounted to the vertical support 14. A horizontal channel 30 is formed through the supporting block 28 through which a first arm 32 slidably extends horizontally away from the vertical support 14. A connector block 34 is mounted to the free end of the first arm 32 and includes a vertical channel 36 formed therethrough which slidably accommodates a second arm 38 extending vertically downwardly. A sighting bore 40 is mounted to the lower end of the second arm 38 and is adjustable to permit visual access and focusing of the shape and perspective of the objects as viewed through the transparent window 18. Locking screws 42 and 44 are provided for on the supporting block 28 and connector block 34 respectively to lock the arms 32 and 38 at their adjusted longitudinal position with respect to the blocks 28 and 34, respectively, and thus adjustably position the sighting bore 40 to optimize the visual focusing.

A pair of support arms 46 are further provided for and fixedly position the vertical support 14 with respect to the horizontal support 12. The support arms 46 are mounted to the vertical support 14 by means of a pair of braces 48 which are formed onto the vertical support and extend horizontally inwardly. Recesses 50 are formed along the edges of the horizontal support 14 and receive the support arms 46 so as to anchor the vertical support 14 with respect to the horizontal support 12. More than one recess pair 50 may be provided so as to adjustably position the vertical support 14 with respect to the horizontal support 12 and thereby optimize the focusing aspect of the present invention.

As an optional feature of the present invention a plurality of spaced, parallel lines are placed on each geometric object 20. The effect of the lines 58 on the objects 20 is to create a more well-defined perspective of the objects when illuminated onto the screen 24. The ability to perceive and recreate the perspectives cast is thus improved by use of the parallel lines 58. Recording of the shapes and perspectives of the objects 20 is accomplished by means of a suitable pen 52 for recording directly onto the transparent window 18. A transparent plastic overlay 54 may also be employed upon the window 18 so as to permit easy transfer of the shapes and perspectives recreated. A horizontal and vertical grid 56 may be placed either upon the transparent window 18 or upon the plastic overlay 54 in order to create a more precise written record of the scene viewed.

The horizontal support 12 and vertical support 14 may conveniently be designed in a carrying case 60 arrangement. In such an instance the vertical support 14 is connected by a hinge 62 to the vertical support 14 so as to conveniently collapse into a case 60. A removable coverboard 64 is provided and supports the objects 20 and screen 24 upon the upper surface of the support 12. This arrangement also permits the screen 24 and objects 20 to be conveniently placed within the horizontal support 12 beneath the coverboard 64 of the carrying case 60 when not in use. A handle 66 is further provided to permit ease of transportation of the carrying case 60. A cover sheet 68 constructed of durable material is also provided to cover and protect the transparent window 18 when the apparatus 10 is not in use.

A method for creating perspective drawings is also disclosed. The method of the present invention includes the step of forming the horizontal and vertical supports in a perpendicular fashion with respect to one another. Additional steps include providing a transparent portion within the vertical support, placing one or more geometric objects upon the horizontal support, viewing the shapes and perspectives of the objects cast through the transparent portion, and creating a written impression of the scene viewed.

Having described my invention, many modifications thereto will become apparent to those skilled in the art to which it pertains without deviation from the spirit of the invention as defined by the scope of the appended claims.

I claim:

1. An apparatus for creating perspective drawings, comprising:
    a horizontal support;
    a vertical support positioned perpendicular to said horizontal support along a common edge;
    a transparent portion formed within said vertical support, said portion permitting visual access therethrough;
    at least one geometric object placeable upon said horizontal support, said at least one object being visible through said transparent portion;
    means for illuminating said at least one object placeable upon said horizontal support;
    a screen vertically supported upon said horizontal support for displaying the shape and perspective of said at least one object;
    means for providing a fixed reference for viewing said at least one object's displayed shape and perspective; and
    means for recording said at least one object's displayed shape and perspective.

2. The invention as described in claim 1, said transparent portion comprising a window formed within said vertical support.

3. The invention as described in claim 1, further comprising means for fixedly supporting said vertical support with respect to said horizontal support.

4. The invention as described in claim 1, said at least one geometric object further comprising a plurality of spaced parallel lines drawn thereon, said lines enhancing the perspectives of said at least one object when cast upon said screen.

5. The invention as described in claim 1, wherein said means for providing a fixed reference for viewing comprises a sighting device mounted onto said vertical support.

6. The invention as described in claim 5, said sighting device comprising:
    a supporting block affixed to an upper edge of said vertical support, said block having a horizontal channel formed therethrough;
    a first arm extending horizontally through and along the axis formed by said horizontal channel;
    a connector block attached to the free end of said first arm, said connector block having a vertical channel formed therethrough;
    a second arm extending vertically through and along the axis formed by said vertical channel; and
    a sighting bore mounted to the bottom of said second arm, said sighting bore focusing said visual perspective of said objects through said transparent portion.

7. The invention as described in claim 6, said sighting device further comprising first and second locking screws mounted to intercept said first and second arms in said horizontal and vertical channels, said screws permitting adjustable positioning and locking of said first and second arms to optimally position said sighting bore.

8. The invention as described in claim 2, said transparent window being constructed of a glass material.

9. The invention as described in claim 3, wherein said means for fixedly supporting said vertical support with respect to said horizontal support comprises a pair of removable vertical support arms located at opposite sides of said vertical support, said arms being mounted to braces formed onto said vertical support, said arms further fitting into recesses formed along the edges of said horizontal support.

10. The invention as described in claim 9, wherein more than one pair of said recesses are positioned along the edges of said horizontal support, said pairs of recesses permitting adjustment of said vertical support with respect to said horizontal support.

11. The invention as described in claim 1, wherein said means for recording said shapes and perspectives comprises a pen for tracing said perspective onto said transparent portion.

12. The invention as described in claim 11, said transparent window further comprises a transparent plastic overlay for recording said perspective.

13. The invention as described in claim 11, said transparent window further comprising a horizontal and vertical grid placed thereon, said grid facilitating the tracing of said shapes and perspectives.

14. The invention as described in claim 1, wherein said horizontal and vertical supports collapse into a carrying case arrangement, said vertical support being hingedly connected to said horizontal support, said horizontal support further defined by a removable cover board to permit storage of said screen and objects within said carrying case when said apparatus is not in use.

15. The invention as described in claim 1, said means for illumination being provided by ambient light sources.

16. The invention as described in claim 16, said means for illumination alternatively provided for by an artificial light source mounted at a desirable angle with respect to said objects.

17. A method for creating perspective drawings, comprising:

connecting horizontal and vertical supports, said vertical support having a transparent central portion;

placing one or more geometric objects upon said horizontal support;

illuminating said objects so as to cast their shapes and perspectives onto a screen behind said vertical support;

viewing said shapes and perspectives cast through said transparent portion; and recording said shapes and perspectives onto said transparent portion.

18. The method as described in claim 17, further comprising the step of drawing a plurality of parallel lines directly onto said geometric objects so as to enhance their perspectives cast upon said screen.

* * * * *